US007612311B2

(12) United States Patent  
Norton et al.

(10) Patent No.: US 7,612,311 B2
(45) Date of Patent: Nov. 3, 2009

(54) METHODS AND SYSTEMS FOR CONTROLLING ELECTRIC HEATERS (75) Inventors: Peter Norton, Emeryville, CA (US); John Distinti, San Jose, CA (US)

(73) Assignee: Lam Research Corporation, Fremont, CA (US)

( * ) Notice: Subject to any disclaimer, the term of this patent is extended or adjusted under 35 U.S.C. 154(b) by 0 days.

(21) Appl. No.: 11/561,323

(22) Filed: Nov. 17, 2006

(65) Prior Publication Data

US 2008/0116180 A1 May 22, 2008

(51) Int. Cl.
H05B 1/02 (2006.01)
(52) U.S. Cl. .................. 219/121.54; 219/497; 219/501; 392/118
(58) Field of Classification Search ............ 219/121.43, 219/121.4, 494, 497, 483–487, 499, 501, 219/502, 121.54; 118/723, 724, 725; 392/116, 392/118

See application file for complete search history.

(56) References Cited

U.S. PATENT DOCUMENTS

| 4,604,517 A | * | 8/1986 | Barry ..................... 219/494 |
| 5,504,306 A | * | 4/1996 | Russell et al. ............. 219/497 |
| 5,925,278 A | * | 7/1999 | Hirst ....................... 219/662 |
| 6,888,108 B2 | * | 5/2005 | Carr ......................... 219/483 |
| 2001/0004073 A1 | * | 6/2001 | Little et al. ................ 219/501 |
| 2004/0188416 A1 | * | 9/2004 | Cao et al. ................... 219/492 |
| 2007/0047990 A1 | * | 3/2007 | Lemaster et al. ............. 399/69 |

FOREIGN PATENT DOCUMENTS

| JP | 58-197525 A | * | 11/1983 |
| JP | 59-062923 A | * | 4/1984 |
| JP | 59-085516 A | * | 5/1984 |
| JP | 2005-202832 A | * | 7/2005 |

OTHER PUBLICATIONS

"International Search Report", Issued in PCT Application No.: PCT/US2007/084467; Mailing Date: Mar. 12, 2008.*

"Written Opinion", Issued in PCT Application No.: PCT/US2007/084467; Mailing Date: Mar. 12, 2008.*

* cited by examiner

Primary Examiner—Mark H Paschall
(74) Attorney, Agent, or Firm—IP Strategy Group, P.C.

(57) ABSTRACT

Systems and methods for controlling a heater to drive a load temperature to approximate a setpoint. At the beginning of each ½ AC cycle, a sigma delta modulation algorithm is computed to determine whether the AC cycle should be turned on or off. The running estimate of the past actual duty cycle is compared to the desired output duty cycle, and the difference between the two is used to adjust the next ½ cycle's output. This results in a pseudo-random pulse sequence output which does not contain significant periodic components that could cause undesirable small periodic thermal 'ripples' on the element being heated.

20 Claims, 7 Drawing Sheets

METHODS AND SYSTEMS FOR CONTROLLING ELECTRIC HEATERS

BACKGROUND OF THE INVENTION

Temperature control is important in many manufacturing processes such as wafer processing. Typically, a load temperature must be controlled within the tolerance of a setpoint, which represents a user-defined ideal value for the load temperature.

Generally speaking, the load temperature may be controlled by controlling the amount of power provided to an electrical heater. The heater is typically controlled by selectively turning on and turning off the electrical power provided from an AC power source to the heater using, for example, a solid state relay (SSR) circuit. Conventionally, the SSR may be controlled by a pulse width modulation (PWM) signal, which is provided to the SSR responsive to a duty cycle command provided by a controller.

The duty cycle command represents the desired percentage of the time that the SSR must turn on the power supply, such that the desired amount of power is supplied to the heater within a given time duration to ensure that the load temperature is within the tolerance of the setpoint. In order to comply with the required tolerance of a given manufacturing process, the duty cycle command typically needs to have a certain level of resolution (or precision). For example, the tolerance may require the duty cycle command to have a resolution of 0.1%. Accordingly, for example, a duty cycle command provided as 65.8% complies with the required tolerance whereas a duty cycle specified simply as 65% does not comply with the required resolution of 0.1%.

Figure 1A:
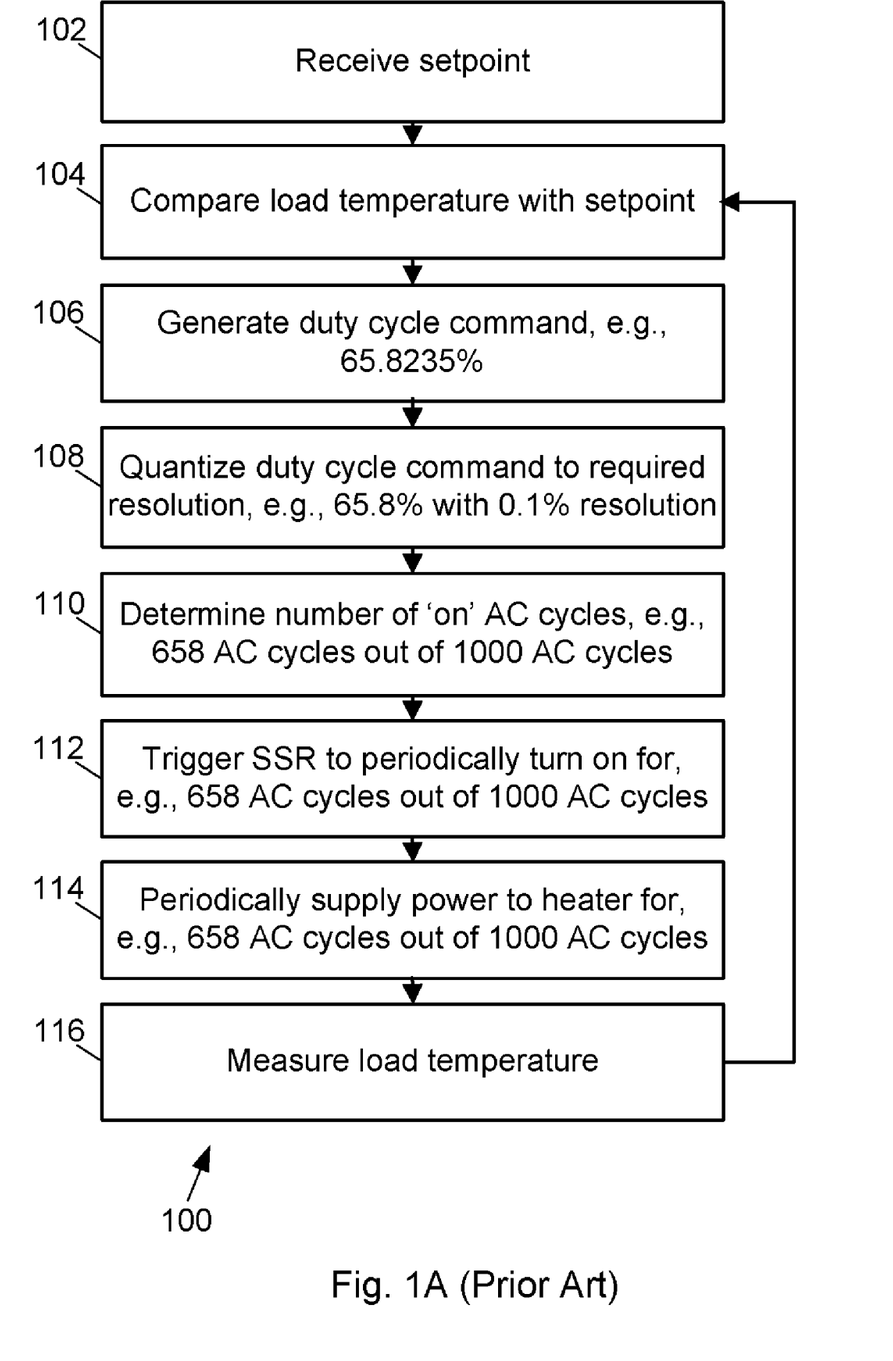
FIG. 1A illustrates a flowchart of an example conventional method for controlling a heater.
Figure 1B:
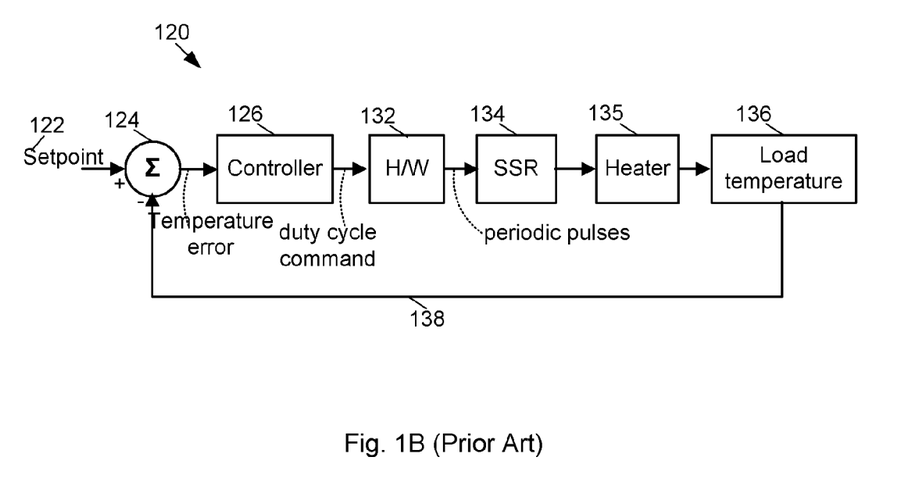
FIG. 1B illustrates an example block diagram of an example conventional system for implementing the example conventional method of FIG. 1A.

An example conventional method for controlling the heater with a required duty cycle command resolution is illustrated in FIGS. 1A and 1B. FIG. 1A illustrates a flowchart 100 of the example conventional method for controlling a heater 135. FIG. 1B shows a corresponding a block diagram 120 of an example conventional system for implementing the example conventional method of FIG. 1A.

The example conventional method starts with step 102, in which a summing function 124 receives a setpoint 122 (see FIG. 1B). Setpoint 122 is typically expressed in degrees of temperature, which may be in Celsius, Kelvin, or Fahrenheit. In step 104, summing function 124 compares a load temperature 136, which may be sensed using, for example, a temperature sensor, with setpoint 122 and outputs a temperature error, i.e., the difference between load temperature 136 and setpoint 122. In step 106, a controller 126 takes into account the setpoint as well as the temperature error and generates a duty cycle command, e.g., 65.8235%.

Next, in step 108, hardware 132 quantizes the duty cycle command into a quantized duty cycle command, e.g., 65.8% with a required resolution, e.g., 0.1%. In step 110, based on the quantized duty cycle command, hardware 132 determines a number of 'on' AC cycles, i.e., a number of AC cycles that the power supply should be turned on. Since the required resolution is 0.1%, 1000 AC cycles are required to permit discrimination to 0.1% precision or 1 out of 1000 cycles. In the current example, the PWM duty cycle may be 658 AC cycles out of 1,000 AC cycles, with the rest of the 1,000 AC cycles being turn off.

In step 112, hardware 132 outputs a PWM signal, i.e., a periodic series of pulses, to trigger a solid state relay 134 (SSR 134) to periodically turn on for the ascertained number of the 'on' AC cycles, e.g., 658 AC cycles out of 1,000 AC cycles. The 658 "on" cycles may be temporally distributed throughout the 1000 AC cycles to ensure smooth power delivery throughout the 1000 cycles of the example.

Consequently, in step 114, the AC power source is controlled by SSR 134 to periodically supply power to heater 135 for the ascertained number of the 'on' AC cycles, e.g., 658 AC cycles out of 1,000 AC cycles.

In step 116, the load temperature 136 is measured, and an iteration of the example conventional method is completed. Subsequently, feedback loop 138 feeds load temperature 136 into summing function 124 for the next iteration of the example conventional method.

As can be appreciated from the above description, if a resolution of R is required, then an iteration of the example conventional method will typically require a time interval of 1/R AC cycles. The time interval represents a response time for updating the duty cycle command. Typically, since R is much less than 1, the time interval, or response time, represents multiple AC cycles. For example, if R=0.1%, the response will be 1,000 AC cycles, or 16.67 seconds.

Figure 2:
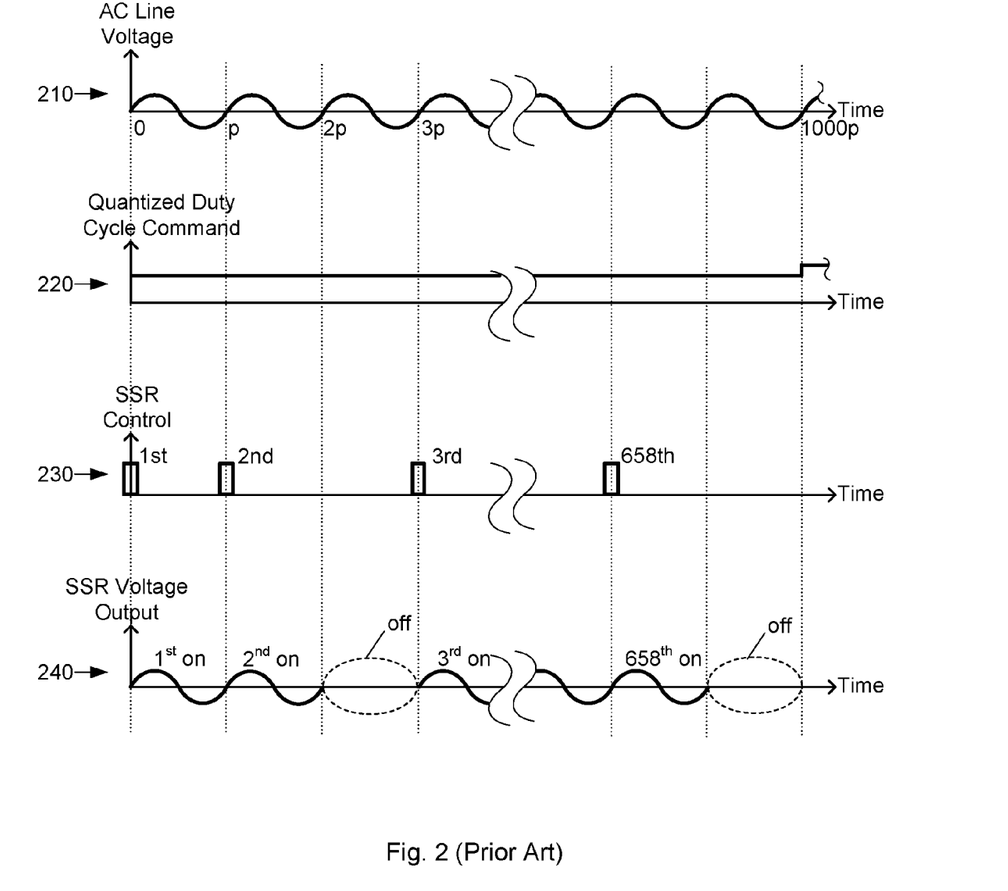
FIG. 2 illustrates various signals of the example conventional method and the example conventional system illustrated in FIGS. 1A and 1B.

FIG. 2 illustrates output signals of the example conventional method and the example conventional system illustrated in FIGS. 1A and 1B.

Signal 210 illustrates the AC line voltage of the AC power source over time. Typically, the AC power source may have an AC frequency of about 60 Hz. Accordingly, each AC cycle (denoted by 'p') represents approximately 16.67 milliseconds (ms).

Signal 220 illustrates the quantized duty cycle command. Signal 230 shows the PWM signal generated by hardware 132, which is used as an input into SSR circuit 134. The output of SSR circuit 134 is shown by signal 240.

As shown in the example of chart 220, the quantized duty cycle command associated with signal 220 remains constant for a time interval of 1,000 AC cycles, or 16.67 seconds, given the AC frequency of 60 Hz. This is because it requires 1,000 AC cycles to complete an iteration of the example conventional method, given the required resolution of 0.1% in the example. However, a response time of 16.67 seconds for updating the duty cycle command may be disadvantageously too long and therefore unacceptable for many manufacturing processes such as wafer processing, which may require a response time of, for example, less 5 seconds with a 0.1% resolution or even finer resolutions.

Furthermore, iterations of the prior art method generally contain the same pattern of "on" pulses and "off" pulses, resulting in a periodically repeating pattern of "on" cycles and "off" cycles for power delivery to the heater. Such periodicity, particularly since they occur over a relatively long period of time, often times negatively affect substrate processing, as it may result in larger peak deviations from the desired setpoint, rendering it more difficult to achieve sufficiently tight process control results from wafer to wafer.

SUMMARY OF INVENTION

This summary is not intended to limit the scope of the present invention, which is commensurate with the claims herein.

The invention relates, in an embodiment, to a method in a plasma processing system for controlling an electric heater. The method includes receiving a setpoint temperature and comparing the setpoint temperature with a load temperature, the load temperature representing a temperature measured for a load that is most recently measured. The method also includes generating a duty cycle command responsive to the comparing. The method additionally includes updating the duty cycle command using a cumulative duty cycle error and quantizing the duty cycle command to a PWM (Pulse Width Modulation) signal, the PWM signal comprising a plurality of on pulses and a plurality of off pulses. The method also includes employing the PWM signal to trigger a solid state relay (SSR) circuit, thereby providing energizing the electric heater responsive to the PWM signal. Furthermore, the method includes adding a value representative of the PWM signal to the cumulative cycle error. The method further includes interrupting the SSR circuit in accordance with a predefined interval that is less than a 60 Hz AC cycle.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention also covers an article of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention also covers apparatuses or systems for practicing embodiments of the invention. Such apparatus may include circuits, dedicated and/or programmable, to carry out operations pertaining to embodiments of the invention. Examples of such apparatus include a general purpose computer and/or a dedicated computing device when appropriately programmed and may include a combination of a computer/computing device and dedicated/programmable circuits adapted for the various operations pertaining to embodiments of the invention.

One or more embodiments of the present invention involve a method for controlling a heater to drive a load temperature to approximate a setpoint. In an embodiment, the apparatus contains an electronic circuit to detect the AC power line zero-crossings which is used to trigger a DSP (digital signal processing) microprocessor which is computing the control loop whose output is the desired heater power expressed as a percentage with 0.1% or better resolution. The DSP microprocessor executes a type of sigma-delta algorithm at the beginning of each AC power line ½ cycle whose result is used to determine if that AC cycle is to be turned on or off. The running estimate of the past actual duty cycle is compared to the desired output duty cycle, and the difference between the two is used to adjust the next ½ cycle's output. This results in a pseudo-random pulse sequence output which does not contain significant periodic components that could cause undesirable small periodic thermal 'ripples' on the element being heated.

In an embodiment, the electric heater represents a heater employed during the processing of substrates. In an embodiment, the substrate is processed in a plasma processing chamber using a plasma-enhanced processing method. The element being heated may represent the substrate itself, or may represent a component of the plasma processing chamber. In an embodiment, the steps disclosed herein are performed using electronic circuitry, which may represent either dedicated logic or programmable logic (e.g., a processor whose function is governed by computer readable instructions).

In an embodiment, the method may include periodically updating a duty cycle command according to a predefined time interval to generate updated duty cycle commands. The time interval is, in an embodiment, less than an AC cycle of an AC power source for the heater. For example, the time interval may be a half of the AC cycle or approximately 8.33 ms for a 60 Hz AC signal. Therefore, the method may provide a response time for updating the duty cycle command that is short enough for controlling heaters in most manufacturing processes, including the aforementioned semiconductor substrate processing.

The method may further include generating a control signal, such as PWM pulses, responsive to the updated duty cycle to trigger, using a SSR circuit for example, the supply of power from the AC power source to the heater. Unlike those generated by prior art techniques, the pulses generated in accordance with an embodiment of the invention tend to be pseudorandom over time. As such, duty cycle errors, i.e., differences between the updated duty cycle commands and ideal duty cycle commands, as well as temperature errors, i.e., differences between updated load temperatures and the setpoint, may also be pseudorandom and may be canceled out and/or be reduced over time.

The method may further involve periodically accumulating, according the time interval, duty cycle errors into a cumulative duty cycle error and including the cumulative duty cycle error in the calculation of the updated duty cycle commands. Generally speaking, the duty cycle error may be computed using the temperature error information that is periodically updated according to the time interval, e.g., the aforementioned ½ AC cycle. Because the duty cycle errors may be pseudorandom, they may be cancelled by one another over time. Consequently, the method may result in a low average temperature error and therefore more accurate temperature control.

Further, one or more embodiments may involve one or more systems or devices that implements the method for controlling the heater. The one or more systems or devices may include at least one of a processing unit, a signal generating unit, a thermometer, a summing unit, a timer, and a computing unit (or equivalents thereof for any or all of the above-mentioned components) for executing one or more steps of the method.

The features and advantages of the present invention may be better understood with reference to the figures and discussions that follow.

Figure 3A:
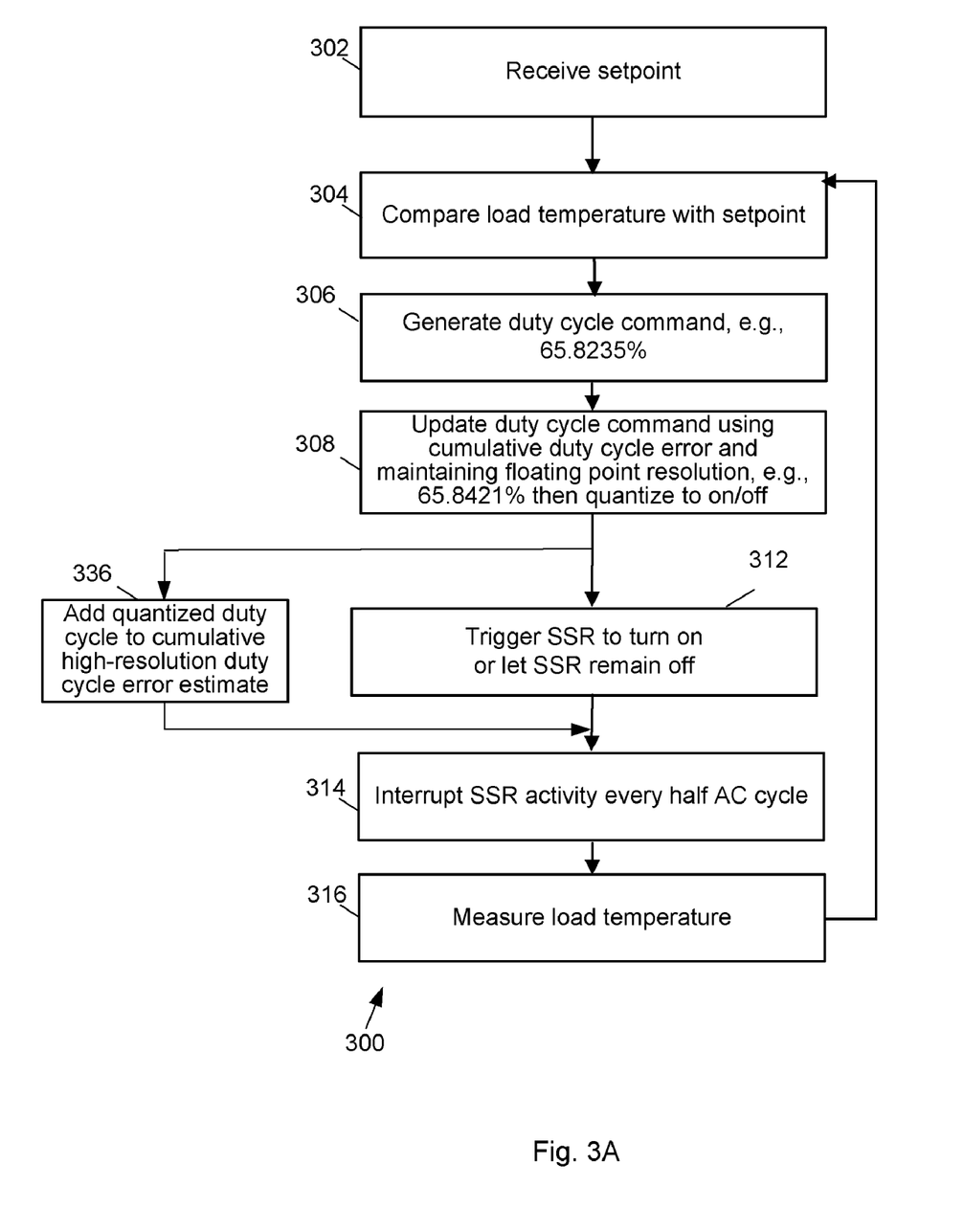
FIG. 3A illustrates, in accordance with one or more embodiments of the present invention, a flowchart of a method for controlling a heater.
Figure 3B:
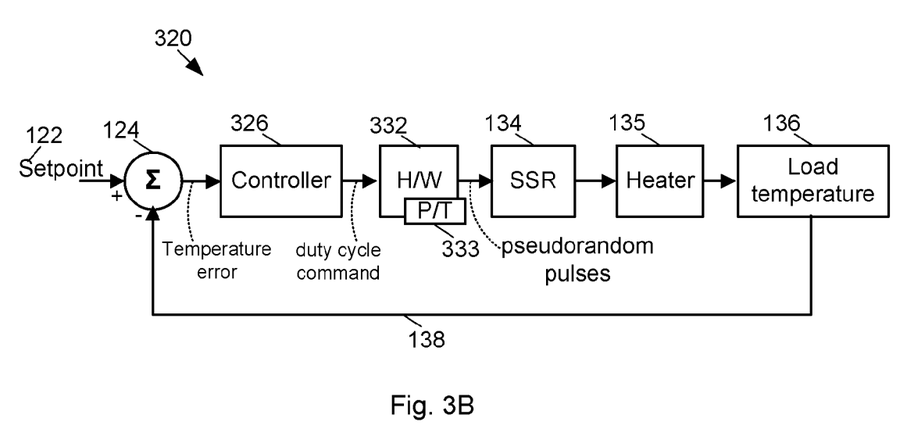
FIG. 3B illustrates an example block diagram of a system for implementing the method of FIG. 3A.

FIG. 3A illustrates, in accordance with one or more embodiments of the present invention, a flowchart 300 of a method for controlling heater 135. FIG. 3B illustrates, in accordance with one or more embodiments of the present invention, a block diagram 320 of a system for implementing the method of FIG. 3A.

The method starts with step 302, in which summing function 124 receives a setpoint 122. As discussed, setpoint 122 is typically expressed in degrees of temperature, which may be in Celsius, Kelvin, or Fahrenheit. In step 304, summing function 124 compares load temperature 136 with setpoint 122 and outputs a temperature error, i.e., the difference between load temperature 136 and setpoint 122. The load temperature may be obtained using an appropriate transducer for measuring the temperature of the load and may include contacting or non-contacting measurement techniques. Then, control is transferred to step 306.

In step 306, a controller 326 takes into account the temperature error and generates a duty cycle command, e.g., 65.8235%.

In step 308, at least one of controller 326 and hardware 332 may update the duty cycle command using the polarity of the cumulative duty cycle error to generate an updated duty cycle command. The updated duty cycle command may maintain the floating point resolution of the duty cycle command according to a resolution precision of controller 326 and/or hardware 332. For illustrative example, when the cumulative duty cycle is included into the duty cycle command 65.8235% with a floating point resolution of 0.1%, the updated duty cycle command 65.8421% with the same floating point resolution may be generated. The updated duty cycle command is then quantized to an on/off value by noting its polarity.

In step 312, hardware 332 generates a pulse for triggering SSR 134 to turn on power from the AC power source to heater 135 according to the quantized on/off duty cycle. Alternatively, according to the updated quantized duty cycle command, hardware 332 may generate no pulse such that SSR 134 remains turned off.

In step 336, the quantized duty cycle is then added to the cumulative high resolution duty cycle estimate.

In step 314, periodically, according to the time interval (e.g., the aforementioned ½ AC cycle), the updated duty cycle command may be deemed obsolete, and SSR 134 may be interrupted using at least one of controller 326, hardware 332, and a periodic timer 333. The time interval may be less than an AC cycle. In an embodiment, the time interval may be a half of an AC cycle (½ AC cycle), i.e., about 8.33 ms. Alternatively or additionally, with the method implemented by keying off any phase of the three-phase AC power signal. Accordingly, the time interval may be ⅓ or ⅙, i.e., 1/(number of phases) or ½/(number of phases). The duration of the interruption may be in the order of nanoseconds and may be negligible compared with the time interval.

Figure 4:
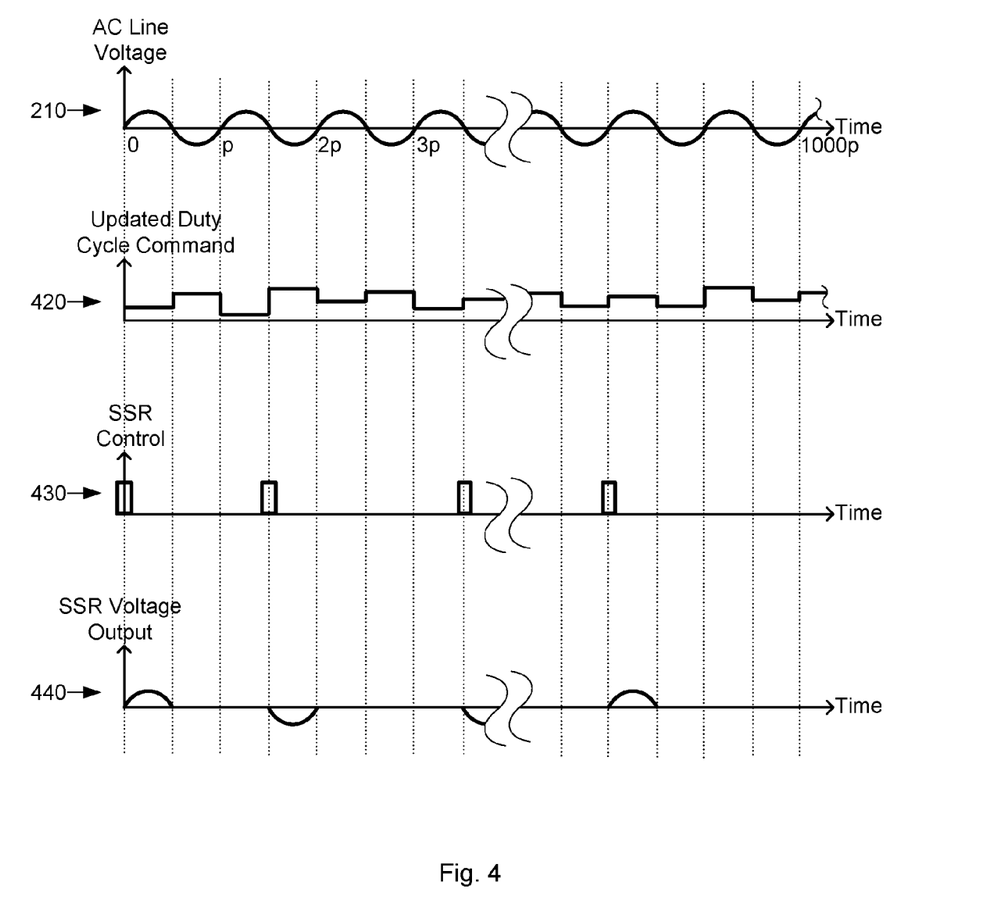
FIG. 4 illustrates, in accordance with one or more embodiments of the present invention, output signals of the method and the system illustrated in FIG. 3.

Then, in step 316, load temperature 136 is measured, and an iteration of the method is completed. Then, feedback loop 138 feeds load temperature 136 into summing function 124, for the next iteration of the example conventional method. The duration of an iteration of the method is approximately the time interval for periodically updating the duty cycle command, e.g., ½ AC cycle. Given a time interval of ½ AC cycle, the updated duty cycle command is replaced by a next updated duty cycle command—adjusted with the cumulative duty cycle command error—every ½ AC cycle, or approximately 8.33 ms. As a result, updated duty cycle commands and, accordingly, pulses provided by hardware 332 for controlling SSR 134 may change at a frequency of 120 Hz and may be pseudorandom over time (as illustrated in FIG. 4). Consequently, load temperature 136 and, accordingly, the temperature error may also be pseudorandom over time (as will be described below with reference to FIG. 5).

FIG. 4 illustrates, in accordance with one or more embodiments of the present invention, output signals of the method and the system illustrated in FIGS. 3A and 3B.

Signal 210 illustrates the AC line voltage of the AC power source over time. Typically, the AC power source may have an AC frequency of 60 Hz. Accordingly, each AC cycle (denoted by 'p') represents approximately 16.67 milliseconds (ms), and ½ AC cycle represents approximately 8.33 ms.

Figure 5:
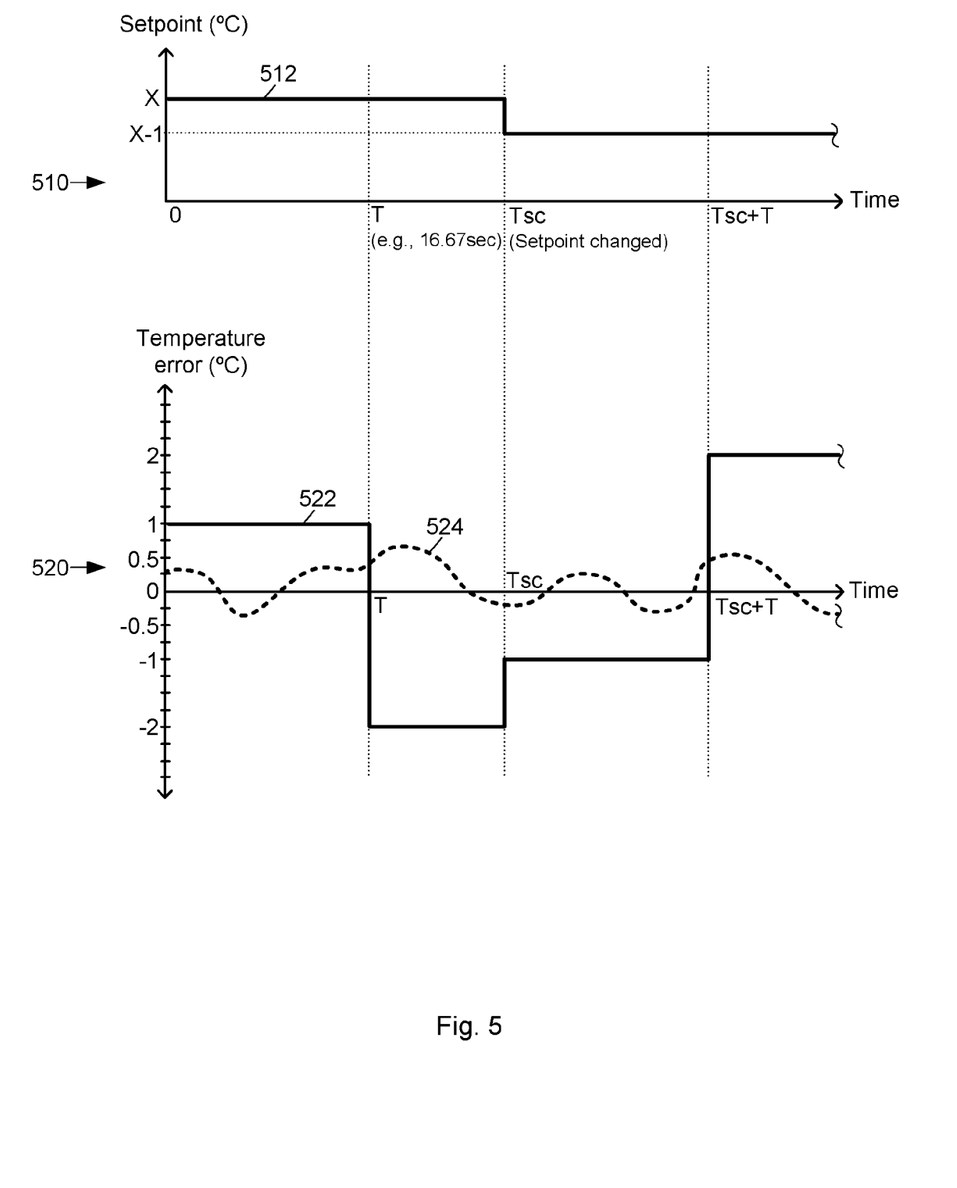
FIG. 5 illustrates a comparison between temperature errors resulted from the example conventional method illustrated in FIG. 1 and from the method in accordance with one or more embodiments of the present invention illustrated in FIG. 3.

Signal 420 illustrates the updated duty cycle command. As shown in the example of signal 420, the updated duty cycle command may change every ½ AC cycle and may be pseudorandom over time. Accordingly, as shown in the example of signal 430, pulses provided by hardware 332 (show in FIG. 3) for controlling SSR 134 (shown in FIG. 3) may be pseudorandom over time. As a result, as shown in the example of signal 440, through SSR 134, the supply of power from the AC power source to heater 135 may also be pseudorandom over time. Consequently, the temperature error may be pseudorandom over time, as illustrated in FIG. 5.

Listing 1 below illustrates a pseudo-code implementation, in accordance with an embodiment of the present invention.

```
/*------------------------------------------------------------------*/
//Function SDOUT( ) sigma delta control task, updates SSR duty cycle setting.
//use DSP BIOS semaphore blocking to synchronize PWM updates
void SDOUT(void)
{
    int i,j;
    float fval;
    for(i=0; i<MAXCHANNELS ; i++)
    {
        //clear timer reg if channel not active
        if((chandata[i].chstate != RUNNING_CHAN) || (!g_heartbeatok &&
!g_outputdefaultcontrol) ||
            ((chandata[i].chtype != PID_1CH_SD_CHAN) && (chandata[i].chtype !=
```

```
PID_1CH_SD_LINELEVEL) && (chandata[i].chtype != MIMO2_SC_CHAN) &&
        (chandata[i].chtype != MIMO2_BR_CHAN) && (chandata[i].chtype !=
MANUAL_PWM_CHAN)) )
    {
       chandata[i].pid.pid_out_reg3 = 0;
       chandata[i].ioval.sd_err = 0.0;
           SEM_pend(&SEM_cpld1pulseregs, SYS_FOREVER);
       CPLD1PulseRegs.chan[i].thresh_low = 0;
       CPLD1PulseRegs.chan[i].thresh_hi = 0
           SEM_post(&SEM_cpld1pulseregs);
    }
       SEM_pend(&SEM_cpld1pulseregs, SYS_FOREVER);
    if(chandata[i].ioval.sd_err >= 1.0) //reset counter and turn on for this ½ cycle period
    {
    if(!(i & 1))//!!!force counter reset w dummy write if is even channel 0,2,4...
       CPLD1PulseRegs.chan[i+1].thresh_hi = 0;
       CPLD1PulseRegs.chan[i].thresh_low = 28;
       CPLD1PulseRegs.chan[i].thresh_hi = 0;
       chandata[i].ioval.sd_err -= 1.0-chandata[i].pid.pid_out_reg3; //subtract quantized value
    }
    else//output = 0 for this ½ cycle period
    {
       CPLD1PulseRegs.chan[i].thresh_low = 0;
       CPLD1PulseRegs.chan[i].thresh_hi = 0;
       chandata[i].ioval.sd_err -= 0.0-chandata[i].pid.pid_out_reg3; //subtract quantized value
    }
       SEM_post(&SEM_cpld1pulseregs);
   }
}
```

Listing 1

FIG. 5 illustrates a comparison between temperature errors resulted from the example conventional method illustrated in FIG. 1 and from the method in accordance with one or more embodiments of the present invention illustrated in FIGS. 3A and 3B.

The example of chart 510 shows that setpoint 512 remains at X° C. until Tsc and then changes to (X−1)° C. In the example of chart 520, temperature errors 522 and 524 represent the temperature errors resulted from using the example conventional method (522) and the method in accordance with one or more embodiments of the present invention (524), respectively, for driving a load temperature to approximate setpoint 512.

According to the example conventional method, with a first duty cycle command, temperature error 522 may remain constant at 1° C. until T. T represents the time duration for an iteration of the example conventional method, e.g., approximately 16.67 seconds or 1000 AC cycles, in order to meet a duty cycle resolution requirement of 0.1%. Then, the example conventional method may enter a next iteration with a second duty cycle command. The example conventional method may include an additional step for updating duty cycle commands in response to changes of setpoint 512.

Accordingly, temperature error 522 may remain constant at −2° C. until Tsc, when setpoint 512 changes. At Tsc, the example conventional method starts a new iteration with a third duty cycle command, and temperature error 522 may change to −1° C. Temperature error 522 may remain at −1° C. for the time duration T until Tsc+T. Then, the example conventional method enters a next iteration with a fourth duty cycle command, which may cause temperature error 522 to change to 2° C. and remain at 2° C. until Tsc+2C.

Contrarily, according to the method in accordance with one or more embodiments of the present invention, duty cycle commands are updated significantly more frequently, e.g., at 120 Hz, or approximately every 8.33 ms. As a result, temperature error 524 may be pseudorandom. Further, because duty cycle errors are accumulated and are included when the duty cycle commands are updated, the duty cycle errors may cancel one another. As a result temperature error 524 may have a smaller average magnitude than temperature error 522.

As can be appreciated from the forgoing, compared with the example conventional method, one or more embodiments of the present invention may result in a significantly lower average error in controlling temperature. Further, since the output signals of the one or more embodiments may be pseudorandom, errors signals may be pseudorandom and may contain no periodic components such that, for example, risk of periodic thermal ripples on the element being heated or periodic manufacturing process faults may be advantageously reduced.

Further, with a significantly shorter interval for updating duty cycle command, embodiments of the present invention may allow for more dynamic temperature control. Still further, by maintaining the float point resolution in updating duty cycle commands, embodiments of the present invention may provide finer precision in temperature control. Therefore, embodiments of the present invention may be suitable for more manufacturing processes than the example conventional method.

While this invention has been described in terms of several embodiments, there are alterations, permutations, and equivalents, which fall within the scope of this invention. The abstract, being limited in word count to comply with the patent practice rules, should not be employed to construe the meaning of the claims herein. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. In a plasma processing system, a method for controlling an electric heater, the method comprising:

a) receiving a setpoint temperature;

b) comparing said setpoint temperature with a load temperature, said load temperature representing a temperature measured for a load that is most recently measured;

c) generating a duty cycle command responsive to said comparing;

d) updating said duty cycle command using a cumulative duty cycle error after step c);

e) quantizing said duty cycle command to a PWM (Pulse Width Modulation) signal after step d), said PWM signal comprising a plurality of on pulses and a plurality of off pulses;

f) employing said PWM signal to trigger a solid state relay (SSR) circuit, thereby energizing said electric heater responsive to said PWM signal;

g) interrupting said SSR circuit in accordance with a predefined interval that is less than a 60 Hz AC cycle; and h) accumulating a duty cycle error into said cumulative duty cycle error after step d), said duty cycle error being a difference between said duty cycle command after said updating and an ideal duty cycle command, wherein said steps a) through h) are repetitively performed.

2. The method of claim 1 further comprising adding a value representative of said PWM signal to said cumulative cycle error prior to performing another set of steps a) through h).

3. The method of claim 1, wherein said predefined interval represents ½ said 60 Hz AC cycle.

4. The method of claim 1 wherein said predefined interval represents one of ⅓ of said AC cycle and a ⅙ of said 60 Hz AC cycle.

5. The method of claim 1 wherein said load represents a structure disposed in a plasma processing chamber.

6. The method of claim 5 wherein said structure represents a substrate being processed in said plasma processing chamber.

7. The method of claim 1 wherein said structure represents a component of said plasma processing chamber.

8. An article of manufacture comprising a program storage medium for storing computer readable code configured for controlling an electrical heater in a plasma processing system, the article of manufacture comprising:

computer readable code for receiving a setpoint temperature;

computer readable code for comparing said setpoint temperature with a load temperature, said load temperature representing a temperature measured for a load that is most recently measured;

computer readable code for generating a duty cycle command responsive to said comparing;

computer readable code for updating said duty cycle command using a cumulative duty cycle error after said generating;

computer readable code for accumulating a duty cycle error into said cumulative duty cycle error after said updating, said duty cycle error being a difference between said duty cycle command after said updating and an ideal duty cycle command;

computer readable code for quantizing said duty cycle command to a PWM (Pulse Width Modulation) signal after said updating, said PWM signal comprising a plurality of on pulses and a plurality of off pulses, wherein said PWM signal is employed to trigger a solid state relay (SSR) circuit, thereby energizing said electric heater responsive to said PWM signal; and computer readable code for interrupting said SSR circuit in accordance with a predefined interval that is less than a 60 Hz AC cycle.

9. The article of manufacture of claim 8 further comprising computer readable code for adding a value representative of said PWM signal to said cumulative cycle error prior.

10. The article of manufacture of claim 8 wherein said predefined interval represents ½ of said 60 Hz AC cycle.

11. The article of manufacture of claim 8 wherein said predefined interval represents one of ⅓ of said AC cycle and a ⅙ of said 60 Hz C cycle.

12. The article of manufacture of claim 8 wherein said load represents a structure disposed in a plasma processing chamber.

13. The article of manufacture of claim 12 wherein said structure represents a substrate being processed in said plasma processing chamber.

14. The article of manufacture of claim 8 wherein said structure represents a component of said plasma processing chamber.

15. An electronic system for controlling an electric heater in a plasma processing system, the electronic system comprising:

logic for receiving a setpoint temperature;

logic for comparing said setpoint temperature with a load temperature, said load temperature representing a temperature measured for a load that is most recently measured;

logic for generating a duty cycle command responsive to said comparing;

logic for updating said duty cycle command using a cumulative duty cycle error after said generating;

logic for accumulating a duty cycle error into said cumulative duty cycle error after said updating, said duty cycle error being a difference between said duty cycle command after said updating and an ideal duty cycle command;

logic for quantizing said duty cycle command to a PWM (Pulse Width Modulation) signal after said updating, said PWM signal comprising a plurality of on pulses and a plurality of off pulses, wherein said PWM signal is employed to trigger a solid state relay (SSR) circuit, thereby energizing said electric heater responsive to said PWM signal;

logic for adding a value representative of said PWM signal to said cumulative cycle error; and logic for interrupting said SSR circuit in accordance with a predefined interval that is less than a 60 Hz AC cycle, wherein said steps a) through g) are repetitively performed.

16. The electronic system of claim 15 wherein said predefined interval represents ½ said 60 Hz AC cycle.

17. The electronic system of claim 15 wherein said predefined interval represents one of ⅓ of said CC cycle and a ⅙ of said 60 Hz AC cycle.

18. The electronic system of claim 15 wherein said load represents a structure disposed in a plasma processing chamber.

19. The electronic system of claim 18 wherein said structure represents a substrate being processed in said plasma processing chamber.

20. The electronic system of claim 15 wherein said structure represents a component of said plasma processing chamber.

* * * * *